United States Patent [11] 3,536,261

| [72] | Inventor | Hendrieka J. Van Den Brink<br>Menigie, South Australia, Australia |
|---|---|---|
| [21] | Appl. No. | 735,094 |
| [22] | Filed | June 6, 1968 |
| [45] | Patented | Oct. 27, 1970 |
| [73] | Assignee | Grasslands Pty. Limited Villawood<br>New South Wales, Australia |

[54] SPRINKLER IRRIGATION DEVICE
2 Claims, 6 Drawing Figs.

[52] U.S. Cl. ..................................................... 239/177,
239/186, 239/212
[51] Int. Cl. ......................................................... B05b 3/18
[50] Field of Search ............................................. 239/11,
177, 184, 188, 186, 212

[56] References Cited
UNITED STATES PATENTS

| 1,064,848 | 6/1913 | Mills............................. | 239/177X |
| 3,259,319 | 7/1966 | Wallace........................ | 239/177 |
| 3,373,936 | 3/1968 | Purtell.......................... | 239/177X |
| 3,381,894 | 5/1968 | Purtell.......................... | 239/177X |

FOREIGN PATENTS

| 324,113 | 8/1920 | Germany...................... | 239/177 |

Primary Examiner—M. Henson Wood, Jr.
Assistant Examiner—Michael Y. Mar
Attorney—Allison C. Collard ABSTRACT: A mobile sprinkler for irrigation which operates about a standpipe and in which the number of sprinklers disposed along the length of the pipe progressively outwardly from the standpipe are in such relationship to the radius that substantially the same volume of water falls on all areas traversed.

Patented Oct. 27, 1970

INVENTOR.
Hendrieka J. Van Den Brink

By

INVENTOR.
Hendrieka J. Van Den Brink

INVENTOR.
Hendrieka J. Van Den Brink

SPRINKLER IRRIGATION DEVICE

This invention relates to an improved sprinkler irrigation device which is particularly useful for watering large areas of pastures.

It is the object of this invention to provide a water sprinkler irrigation device which will water a large area progressively and in a cyclic pattern.

I have discovered that large areas, whether bounded by straight or curved boundaries, may be watered in a cyclic pattern, and the watering will be effective for substantially the whole area enclosed by its boundary, provided the length of a sprinkler pipe line is such that it extends from the boundary and a water supply standpipe about which the sprinkler pipe is traversed.

According to this invention an improved sprinkler irrigation device comprises a standpipe either fixed or movable and adapted to be connected to a pressurized water source, a sprinkler pipe rotationally engaging at one end the standpipe, and in communication for waterflow therewith, and having its free end extending outwards from the standpipe, the sprinkler pipe being curved back from its free end towards the standpipe in the opposite direction of the travel of the sprinkler pipe about the standpipe a series of carriages supporting the sprinkler pipe along its length disposed substantially transverse to the axis of the sprinkler pipe during movement thereof, a series of sprinklers disposed along the length of the sprinkler pipe arranged to discharge water substantially in proportion to the rate of movement of that part of the pipe at which the sprinkler is and/or a trailing sprinkler disposed, said sprinkler pipe being free to move forward at its free end. The water is preferably drained out of the main pipe while moving same to reduce weight.

Square corners can be watered by an independent system perhaps fed from the main sprinkler pipe.

The cross-sectional size of the sprinkler pipe should be at least sufficient to supply the water requirements of the sprinklers and as an example, a square paddock having a side dimension of 270 yards (that is, 15 acres) can be watered with the device of this invention when a 2-inch-diameter sprinkler pipe of 210 yards length is used. It is preferred that the sprinkler pipe be aluminum alloy construction and thereby provide lightness and flexibility.

Sprinklers may be disposed along the length of the sprinkler pipe and arranged for volumetric discharge of water substantially in proportion to the rate of movement of that part of the pipe at which the sprinkler and/or a trailing sprinkler is disposed.

To enable the invention to be fully understood, embodiments will now be described with reference to the accompanying drawings in which.

Figure 1:
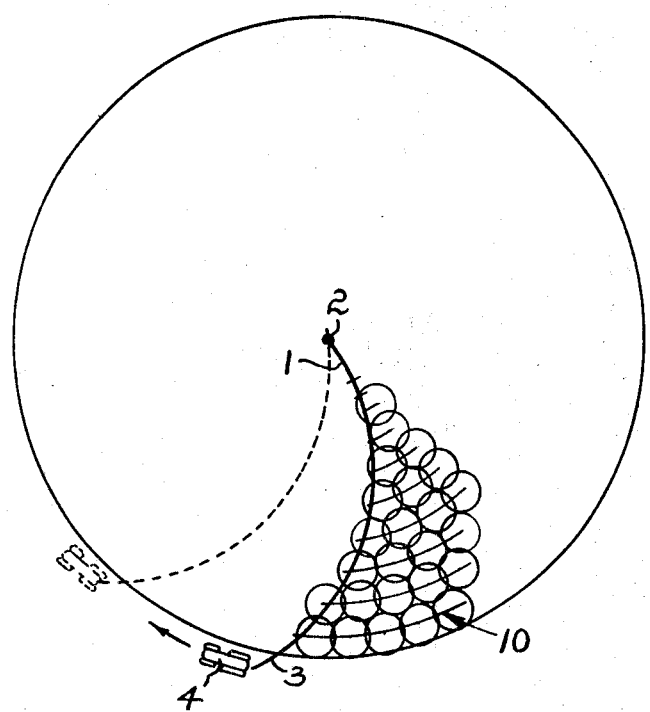
FIG. 1 is a plan view showing how a line of sprinklers with trailing sections can be drawn around a circle to water a plot.
Figure 2:
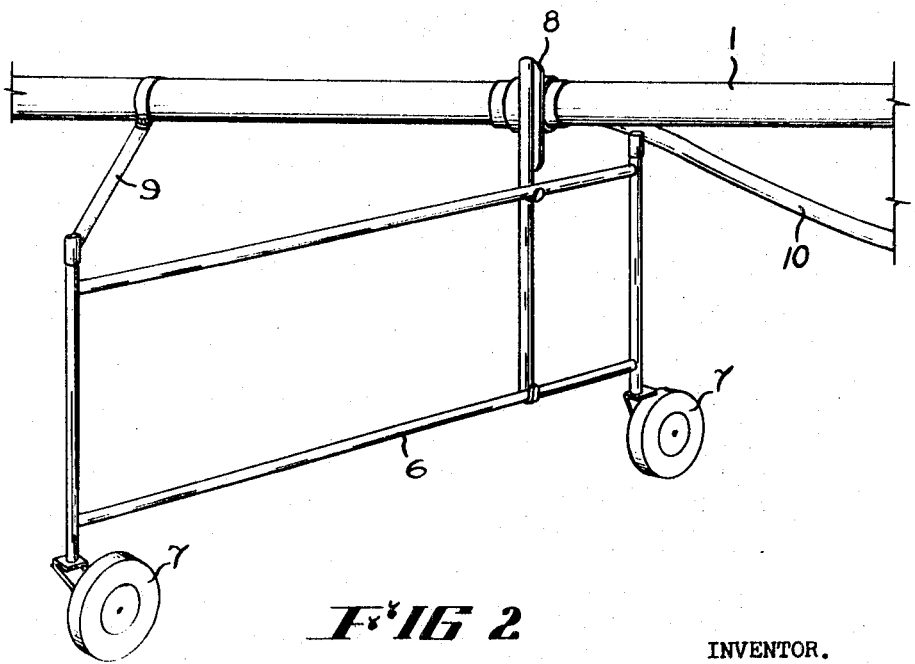
FIG. 2 is a view of the carriage which carries the hose and which forms the main drafting line of the unit.
Figure 3:
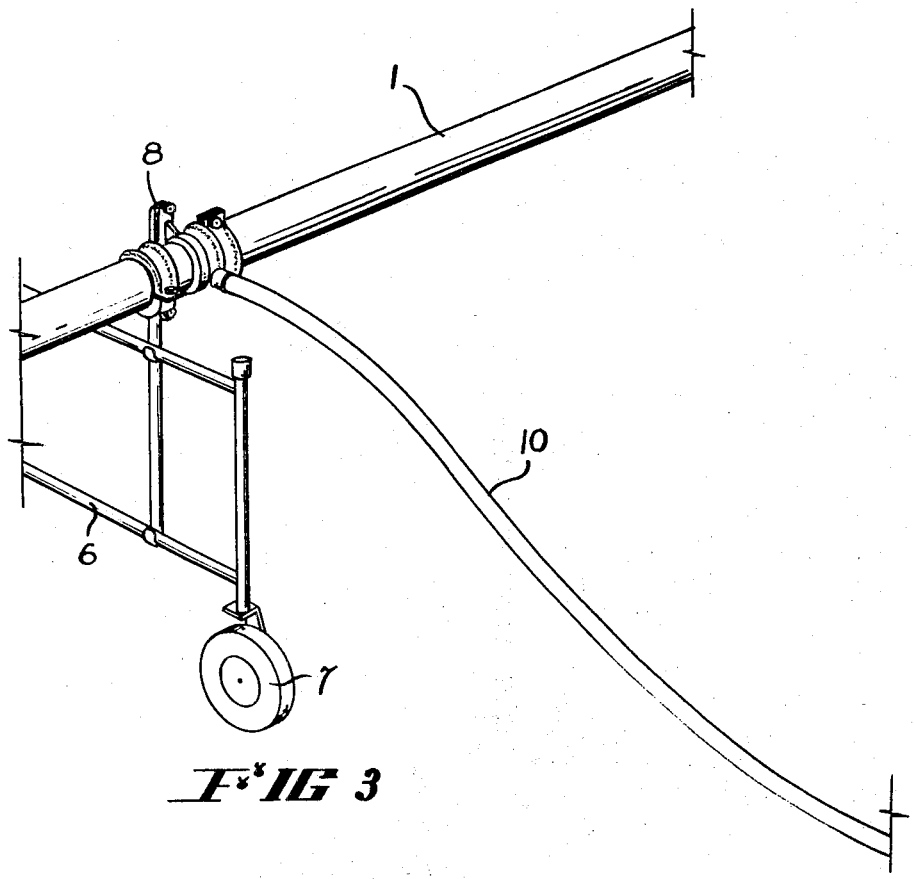
FIG. 3 is a view showing how the trailing hoses with their individual sprinklers are attached.
Figure 4:
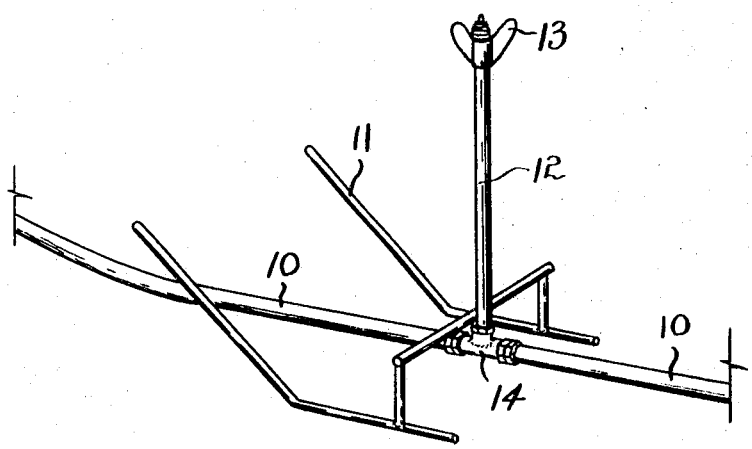
FIG. 4 is a perspective view showing how the sprinkler standpipes are attached to skids which enable them to be drawn along on the ground.

Referring first to the embodiments of FIGS. 1 to 4 it is to be noted that the main pipeline 1 is anchored at a standpipe 2 which forms the center of the area to be irrigated, the free end 3 of the pipeline being attached to a tractor 4 so that as the tractor moves circularly around the anchor 2 the main pipeline 1 will be stretched out but will curve back according to the load on it, this load being readily adjusted by the position of the tractor which may be automatically steered or hand driven, automatic steering being feasible because it is possible to use a guide rope or wire for steering also operating about the anchor 2.

The main pipeline 1 has on it a series of carriages 6 having castor wheels 7 thereon, the carriages having brackets 8 secured thereto which connect to the main pipe 1, the carriages also having a stabilizer rod 9 connected between it and the pipe 1 which is remote from the bracket 8 so as to hold the carriages in correct operating position.

Attached to the main pipeline 1 to be in communication therewith are a series of hoses 10 which trail behind the pipeline 1 and which have skids 11 secured to pipes 12 at the top end of which are sprinklers 13, the skids being shaped to move over the ground and support the sprinklers in a vertical position.

A T-piece 14 at the base of each standpipe 12 allows sections of each trailing hose 10 to extend to any required number of sprinklers and it will be obvious that to obtain the required amount of watering at different parts of the radius of the main pipeline 1 the number of sprinklers can be adjusted so that the amount of water issuing from the sprinklers will be proportional to the radial distance.

Figure 5:
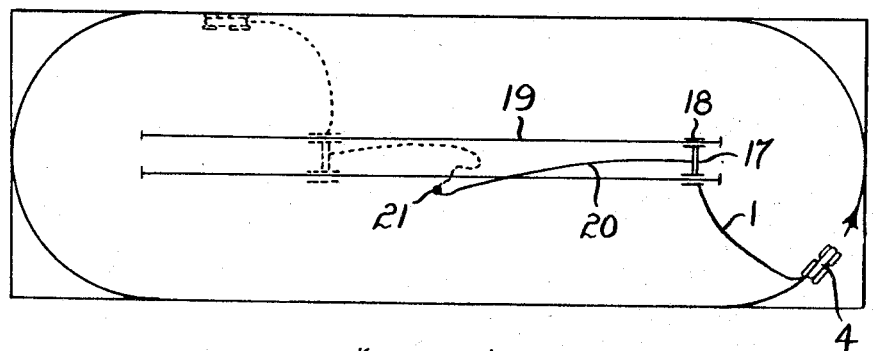
FIG. 5 shows how the movement of the sprinkler can be elongated to cover a field of other than circular shape.

In the embodiments shown in FIG. 5 exactly the same arrangement is used but instead of the fixed standpipe anchor 2 a movable standpipe anchor 17 is used which is mounted on a pair of wheels 18 running on tracks 19 so that as the pull on the pipeline 1 exerts a forward force on the movable anchor 17 this anchor will be drawn along the field to allow the elongated path to be undertaken by the tractor 4, or a tractor or the like can move this end.

A flexible hose 20 between the supply pipe 21 allows the movable anchor 17 to move the wheels 18 along the tracks 19.

Figure 6:
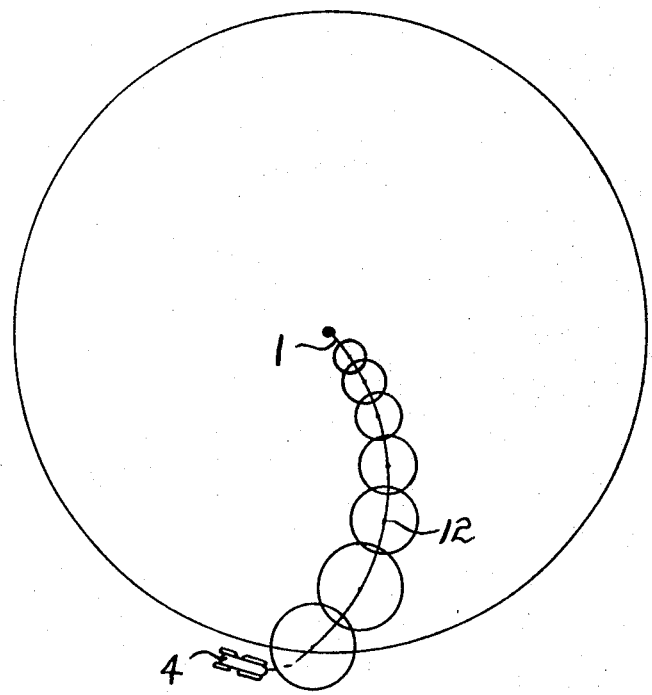
FIG. 6 shows how by regulating the volume of each sprinkler, the sprinklers can be affixed to the sprinkler pipe itself.

It is of course possible by varying the size or spacing of the sprinklers along the main pipe 1 to do away with the trailing hoses such an embodiment being shown in FIG. 6 of the drawings in which case the same carriages 6 will be used but the sprinklers will be fixed directly on to the main pipelines 1 instead of on to the trailing hoses 10. In this case, to obtain correct volumetric supply of water at each area, the capacity of the sprinklers is increased outwardly to obtain more overlap between sprinklers or otherwise to compensate for the faster sprinkler pipe movement at one end.

It will be realized that for long narrow areas it would be more convenient to divide the area into smaller areas which more nearly approach a square, that is, use a standpipe and guide means for each smaller area and use one sprinkler irrigation device of the invention for each smaller area, but the moving standpipe can be used for rectangular sections of land.

Of course, it will be realized that the length of the sprinkler pipe could be varied by including telescopic sections.

While only a few embodiments of the present invention have been shown and described, it will be understood that many changes and modifications may be made thereunto without departing from the spirit and scope of the invention.

I claim:
1. A mobile sprinkler for irrigation comprising:
   a flexible standpipe adapted to be connected to a pressurized water source;
   a sprinkler pipe engaging the standpipe at one end and in communication for water flow therewith and having its free end extending outwards from said standpipe, said sprinkler pipe being unbraced to permit it to curve back from its free end towards said standpipe in the opposite direction of travel of said sprinkler pipe about said standpipe when forward and outward movement is applied to its free end;
   a series of independent carriages supporting said sprinkler pipe along its length and disposed substantially transverse to the axis of said sprinkler pipe at that locality during movement thereof;
   a series of sprinklers disposed along the length of said sprinkler pipe arranged for volumetric discharge of water substantially in proportion to the rate of movement of that part of the pipe at which said sprinklers are disposed; and
   a wheeled vehicle mounted upon an elongated track for supporting the connection between said sprinkler pipe and said flexible standpipe.

2. The mobile sprinkler according to claim 1 comprising hoses, wherein a predetermined volumetric discharge is obtained by arranging sprinklers along said hoses trailed behind and in communication with said sprinkler pipe, ground-engaging skids for carrying said sprinklers, and means attaching said skids to the hoses, said number of sprinklers in said trailing hoses varying in proportion to the area being covered.